United States Patent

Waltner (10) Patent No.: US 9,944,388 B2
(45) Date of Patent: Apr. 17, 2018

(54) ROTORCRAFT STATE CONTROL

(71) Applicant: Sikorsky Aircraft Corporation, Stratford, CT (US)

(72) Inventor: Peter J. Waltner, Royal Palm Beach, FL (US)

(73) Assignee: Sikorsky Aircraft Corporation, Stratford, CT (US)

(*) Notice: Subject to any disclaimer, the term of this patent is extended or adjusted under 35 U.S.C. 154(b) by 0 days.

(21) Appl. No.: 15/248,753

(22) Filed: Aug. 26, 2016

(65) Prior Publication Data

US 2017/0190416 A1    Jul. 6, 2017

Related U.S. Application Data

(60) Provisional application No. 62/210,709, filed on Aug. 27, 2015.

(51) Int. Cl.
   *B64C 27/57*     (2006.01)
   *B64C 27/82*     (2006.01)
   *B64C 27/32*     (2006.01)

(52) U.S. Cl.
   CPC ............. *B64C 27/57* (2013.01); *B64C 27/32* (2013.01); *B64C 27/82* (2013.01)

(58) Field of Classification Search
   CPC .......... B64C 27/32; B64C 27/57; B64C 27/82
   USPC .......................................................... 701/3
   See application file for complete search history.

(56) References Cited

U.S. PATENT DOCUMENTS

| | | | |
|---|---|---|---|
| 3,559,927 A | 2/1971 | Baekken | |
| 3,794,273 A * | 2/1974 | Girard | B64C 27/026 244/17.19 |
| 4,319,722 A | 3/1982 | Pesando | |
| 4,585,391 A * | 4/1986 | Vuillet | B64C 27/82 415/121.3 |
| 4,786,014 A | 11/1988 | Pesando et al. | |
| 4,958,289 A * | 9/1990 | Sum | B64C 11/305 416/27 |
| 5,588,618 A * | 12/1996 | Marze | B64C 27/82 244/17.19 |
| 5,634,611 A * | 6/1997 | Marze | B64C 27/82 244/17.19 |
| 5,687,930 A | 11/1997 | Wagner et al. | |
| 6,497,385 B1 * | 12/2002 | Wachspress | B64C 27/28 244/17.11 |
| 7,025,304 B2 | 4/2006 | Kolliopoulos | |
| 8,052,094 B2 * | 11/2011 | Roesch | B64C 27/26 244/17.13 |

(Continued)

FOREIGN PATENT DOCUMENTS

EP         631930 A1     1/1995

*Primary Examiner* — Tyler J Lee (74) *Attorney, Agent, or Firm* — Locke Lord LLP; Scott D. Wofsy; Joshua L. Jones (57) ABSTRACT

A method of rotorcraft state control includes receiving command input indicative of an intended state change in a rotorcraft. The method also includes issuing command output to a rotor actuation system to carry out the intended state change by varying drag and/or efficiency on one or more rotor blades of the rotorcraft. Issuing command output can include issuing a command output to the rotor actuation system to carry out the intended state change by increasing drag at a substantially constant thrust on one or more rotor blades of the rotorcraft.

14 Claims, 5 Drawing Sheets

(56) References Cited

U.S. PATENT DOCUMENTS

| | | | |
|---|---|---|---|
| 8,790,081 B1* | 7/2014 | Burger | B64C 11/343 |
| | | | 415/30 |
| 8,944,365 B2* | 2/2015 | Groen | B64C 27/473 |
| | | | 244/17.11 |
| 8,955,801 B2 | 2/2015 | McGeer et al. | |
| 9,193,453 B2* | 11/2015 | Vallart | B64C 27/12 |
| 9,604,722 B1* | 3/2017 | Groen | B64C 27/023 |
| 2010/0014981 A1* | 1/2010 | McGeer | B63H 1/26 |
| | | | 416/240 |
| 2010/0224720 A1* | 9/2010 | Roesch | B64C 27/26 |
| | | | 244/12.3 |
| 2011/0211959 A1* | 9/2011 | Bianchi | B64C 27/33 |
| | | | 416/131 |
| 2012/0153073 A1* | 6/2012 | Groen | B64C 27/473 |
| | | | 244/17.13 |
| 2013/0134256 A1* | 5/2013 | Gaillard | B64C 27/82 |
| | | | 244/17.21 |
| 2014/0252158 A1* | 9/2014 | Schaeffer | B64D 31/06 |
| | | | 244/17.13 |

* cited by examiner

FIG. 5C

ROTORCRAFT STATE CONTROL

CROSS-REFERENCE TO RELATED APPLICATION

This application claims the benefit of priority under 35 U.S.C. § 119(e) to U.S. Provisional Application No. 62/210,709, filed Aug. 27, 2015, which is incorporated herein by reference in its entirety.

BACKGROUND OF THE INVENTION

1. Field of the Invention

The present disclosure relates to rotorcraft, and more particularly to systems and methods for controlling rotorcraft.

2. Description of Related Art

Traditional rotorcraft, such as conventional helicopters, use cyclic control of rotor blades to alter the direction of the thrust vector of the rotor blades for maneuvering. For side-to-side motion in a traditional helicopter, for example, the cyclic control of the rotor blades rolls the aircraft slightly toward the direction of side-to-side movement, and when the side-to-side movement is complete, the cyclic control must be used to roll the aircraft in the opposite direction to cancel out the side-to-side motion. Similar techniques can be used for forward and backward motion.

Traditionally, the engine speed and rotation rate of the rotor can remain substantially constant, and ascent and descent are achieved through collective control. Collective control is achieved by altering the pitch of the rotor blades collectively, for example to increase lift for ascent or decrease lift for descent.

Such conventional methods and systems have generally been considered satisfactory for their intended purpose. However, there is still a need in the art for improved systems and methods for controlling rotorcraft. The present disclosure provides a solution for this need.

SUMMARY OF THE INVENTION

A method of rotorcraft state control includes receiving command input indicative of an intended state change in a rotorcraft. The method also includes issuing command output to a rotor actuation system to carry out the intended state change by varying drag and/or efficiency on one or more rotor blades of the rotorcraft. Issuing command output can include issuing a command output to the rotor actuation system to carry out the intended state change by increasing drag at a substantially constant thrust on one or more rotor blades of the rotorcraft.

The intended state change can include a horizontal translation of the rotorcraft, a change in speed of the rotorcraft, or and/or a change in trim attitude of the rotorcraft, and issuing command output can include issuing command output to the rotor actuation system to control rotor drag as a function of azimuthal blade position cyclically to carry out the horizontal translation. Command output can be issued to the rotor actuation system to control rotor pitch cyclically to counter aircraft rotation in any combination of roll and pitch induced by controlling rotor drag and to control tail rotor thrust to counter increased torque on the main rotor due to increased main rotor drag. Countering aircraft rotation can include maintaining substantially constant heading and aircraft attitude in forward or rearward flight while laterally translating to a new track line. It is also contemplated that countering aircraft rotation can include maintaining a substantially constant heading and aircraft attitude while translating to a new position in hover. Receiving command input can include receiving a command to enter drag translation mode prior to receiving command input indicative of an intended state change and issuing command output. It is also contemplated that receiving a command to enter drag translation mode can include selecting whether drag translation mode should be entered based on at least one of pilot input, auto-pilot input, and data regarding aircraft state.

In another aspect, receiving command input can include receiving a command to enter a power delivery response mode prior to receiving command input indicative of an intended state change and issuing command output. The intended state change can include entering a power delivery response mode, and issuing command output can include issuing command output to the rotor actuation system to control rotor drag for an intended power delivery response. The method can include monitoring power demand and rotor speed, wherein issuing command output includes issuing command output to the rotor actuation system to vary rotor drag to maintain substantially constant power output from a power plant powering the rotor blades.

The method can include monitoring frequency and amplitude at which power is being demanded by the rotorcraft by monitoring at least one of power, torque, rotor speed (NR), or power plant state parameters including speed, temperature or amperage; and actively managing fluctuations in power required by issuing command output to a rotor actuation system to vary drag and/or efficiency on one or more rotor blades of the rotorcraft to ensure the power plant can deliver power at the required frequency and/or amplitude. The method can include monitoring ambient conditions, determining whether the rotorcraft is in an ambient condition in which the power plant would have an unsatisfactory power-delivery response, and if so, commanding extra steady state drag and/or reduced rotor system efficiency on the rotor to drive an increase in power required such that a combination of natural power plant power response rate and a rate at which drag power is shed can meet a satisfactory power-delivery response. In another aspect, the method can include monitoring rotorcraft state parameters and a predefined minimum desired power plant state, and commanding an increase of rotor drag and/or reduced rotor system efficiency such that power plant state parameters do not fall below a predefined threshold.

In another aspect, receiving command input can include receiving a command to enter an overspeed protection mode prior to receiving command input indicative of an intended state change and issuing command output. The method can include monitoring at least one of rotor speed, aircraft pitch, and/or control commands and/or rates for cyclic and/or collective, and increasing rotor drag and/or reducing rotor efficiency to prevent rotor overspeed in response to rotor speed approaching overspeed. Issuing command output can include issuing command output to the rotor actuation system to apply differential cyclic to two coaxial, counter-rotating rotor systems in a coaxial rotorcraft An aircraft includes a rotor system including blades to provide thrust for the aircraft at a rotor efficiency, a power system which powers the rotor system at a power output level, a controller, e.g., a drag controller, which selectively changes a rotor efficiency of the rotor system to change a rotor system state of the aircraft without changing the power output level. The drag controller can include machine readable instructions for carrying out any of the methods and/or modes described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
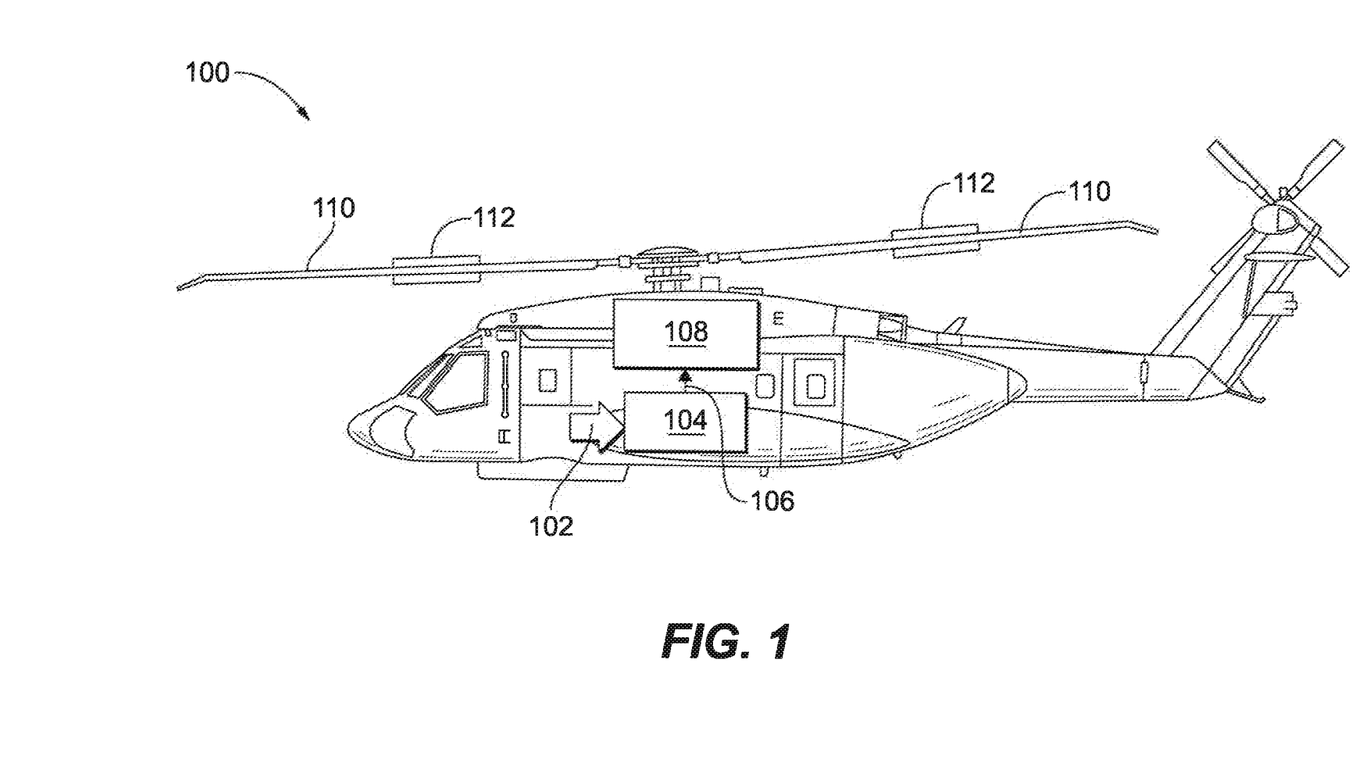
FIG. 1 is a schematic side elevation view of an exemplary embodiment of a rotorcraft constructed in accordance with the present disclosure, showing a drag controller and actuation system.

Reference will now be made to the drawings wherein like reference numerals identify similar structural features or aspects of the subject disclosure. For purposes of explanation and illustration, and not limitation, a partial view of an exemplary embodiment of a rotorcraft in accordance with the disclosure is shown in FIG. 1 and is designated generally by reference character 100. Other embodiments of rotorcraft in accordance with the disclosure, or aspects thereof, are provided in FIGS. 2-5C, as will be described. The systems and methods described herein can be used to control rotorcraft state by controlling drag on the rotor blades, although it is understood that other mechanisms can be used to create the on blade force differentials.

A method of rotorcraft control includes receiving command input indicative of an intended state change in a rotorcraft 100. The command input is indicated schematically in FIG. 1 by arrow 102, and can be input, e.g., from a pilot, crew member, operator, flight computer, autopilot system, or the like, into drag controller 104. Drag controller 104 issues command output, indicated by arrow 106 in FIG. 1, to a rotor actuation system 108 to carry out the intended state change by increasing and/or decreasing drag and/or efficiency on one or more rotor blades 110 of rotorcraft 100. Rotor actuation system 108 includes actuators for drag system 112, and optionally for the main rotor actuators for collective and cyclic control. Drag controller 104 includes machine readable instructions for carrying out any of the methods and/or modes described herein, and can be incorporated as a module in an engine control unit, flight control computer, or the like, e.g., to coordinate drag control, rotor system control, and power plant control as described in greater detail below.

Drag system 112 can include any suitable type of control surface or control scheme. It is advantageous for drag system 112 to controllably impart drag on rotor blades 110 at a substantially constant thrust. Such drag can be produced, for example if drag system 112 includes air-brakes, drag surfaces on the rotor blades which increase drag at a relatively constant thrust, spoilers, trim tabs, or the like. Drag system 112 can advantageously be configured to increase drag while reducing lift, and the drag surfaces can be used in combination with cyclic and collective control of rotor blades 110 as needed to generate control over drag with a relatively constant level of thrust. It is entirely possible that in certain of the above embodiments of drag system 112, increasing drag can increase blade pitching movement at constant thrust. For example, actuation system 108 can have authority to control cyclic and collective action of rotor blades 110 and to control tail thrust of tail rotor blades 111 as well as to control drag system 112 to implement the modes and methods described herein. By these mechanisms, command output can include issuing a command output to rotor actuation system 108 to carry out the intended state change by varying drag at a substantially constant main rotor thrust on one or more rotor blades 110 of rotorcraft 100. While described in terms of the drag system 112 increasing drag, it is understood that the drag system 112 could also create localized drag reductions as opposed to localized drag increases, such as through selective blowing of air over the blade 110 whereby the drag increase would be caused by selective reduction of the drag reduction device.

Figure 2:
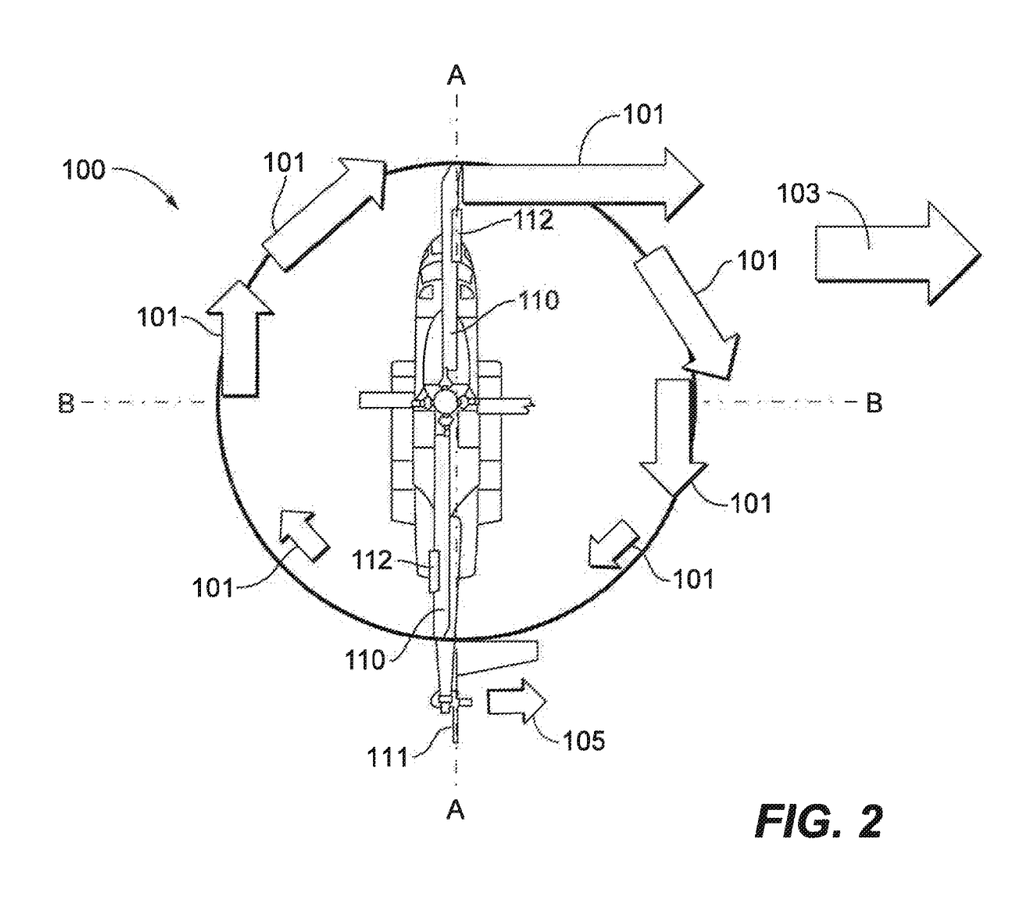
FIG. 2 is a schematic plan view of the rotorcraft of FIG. 1, indicating drag vectors for horizontal translation.

With reference now to FIG. 2, the intended state change can include a horizontal translation of rotorcraft 100, and issuing command output, e.g., from drag controller 104, can include issuing command output to rotor actuation system 108 to control rotor drag as a function of azimuthal blade position cyclically to carry out the horizontal translation. The disc in FIG. 2 represents rotating blades 110, and the large arrows 101 indicate incremental drag vectors that vary with azimuth due to cyclic control of drag system 112 on blades 110. This increase in rotor drag will result in an increase in main rotor torque which must be counteracted by an incremental tail rotor thrust vector 105 in order to maintain heading. In this example, the portions or components of the drag vectors 101 oriented along the axis A in FIG. 2 cancel each other out. However, summing the horizontal vector components of the drag vectors 101 aligned along axis B with incremental tail rotor thrust vector 105 yields a bulk vector 103 aligned with axis B in FIG. 2. In other words, the cumulative effect of the drag vectors 101 and incremental tail rotor thrust 105 is a net drag vector 103 as shown in FIG. 2. This bulk vector 103 represents a force that will tend to translate rotorcraft 100 along axis B in the direction of bulk vector 103 in FIG. 2. The sum of drag vectors 101 will not always need to be selected to align with the incremental tail rotor thrust vector 105 and the cyclic control of drag system 112 can thus be varied to generate a net or bulk drag force vector in any direction of the azimuth, so drag controller 104 can cause horizontal translation of rotorcraft 100 in any direction from a hover, for example. In level flight, the cyclic control of drag system 112 can be varied to generate a net side force such that the ground track may be altered. It is also contemplated that the cyclic control of drag system 112 can be aligned with the longitudinal axis A of the rotorcraft 100 to enable the rotorcraft 100 to adjust speed.

Due to the fact that the drag forces acting on drag system 112 are above the center of gravity of rotorcraft 100, some combination of roll and/or pitch may result when the intended state change is a horizontal translation as described above. To counter this, command output can be issued to the rotor actuation system to control rotor pitch cyclically to counter aircraft rotation in any combination of roll and pitch induced by controlling rotor drag. This can allow for maintaining substantially constant attitude and heading in level, climbing, and descending forward or rearward flight while laterally translating to a new track line and/or adjusting speed. It is also contemplated that countering aircraft rotation can include maintaining a substantially constant aircraft attitude while translating in hover, for example for precise maneuvering for external load operations, hoist operations, landing or takeoff, for example. It is also contemplated that the aircraft pitch and roll attitude can be trimmed to a selected value in order to increase or decrease trim pitch and roll attitude to accommodate a given aircraft operational need. For example, roll trim can be decreased in a crosswind so an external hoist line will not rub up against the airframe while hoisting a load up or down.

Receiving command input can include receiving a command to enter drag translation mode for maneuvering as described above prior to receiving command input indicative of an intended state change and issuing command output. It is also contemplated that receiving a command to enter drag translation mode can include selecting whether drag translation mode should be entered based on at least one of pilot input, crew input, operator input, auto-pilot input, and data regarding aircraft state. For example, a hat button, dials, or the like can be included on the cyclic stick to allow the pilot to input maneuver commands in drag translation mode. In another exemplary embodiment, the cyclic stick can be configured so that small motions near the neutral position are issued as drag translation mode maneuver commands, and large motions and/or motions of the cyclic stick farther from the neutral positions are issued as normal cyclic control commands.

Figure 3A:
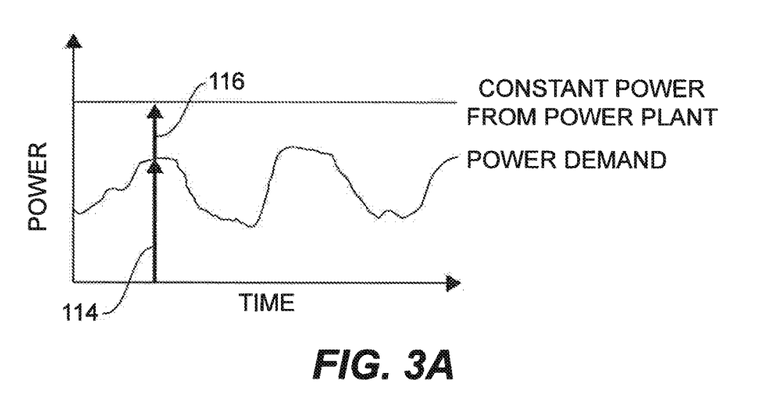
FIGS. 3A and 3B are diagrams for an exemplary embodiment of power delivery response modes for the rotorcraft of FIG. 1.
Figure 3B:
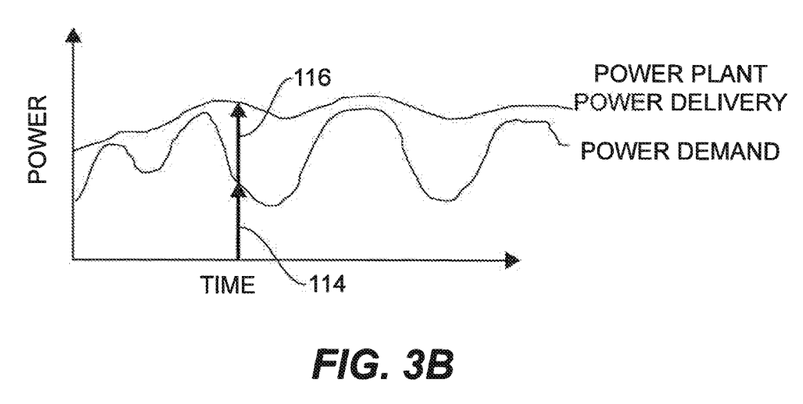

Referring now to FIGS. 3A and 3B, receiving command input can include receiving a command to enter a power delivery response mode prior to receiving command input indicative of an intended state change and issuing command output. The intended state change can include having drag controller 104 enter a power delivery response mode. In this mode, command output is issued from drag controller 104 to rotor actuation system 108 to control rotor drag for an intended power delivery response. This can include monitoring power demand, pilot control inputs, automated control inputs, and/or rotor speed, wherein issuing command output includes issuing command output to rotor actuation system 108 to vary rotor drag to maintain substantially constant power output from a power plant, e.g., the engine E of rotorcraft 100, powering the rotor blades 110.

The diagram in FIG. 3A illustrates a power demand curve that varies over time, wherein time extends along the horizontal axis and power is represented along the vertical axis. Since power demand varies over time, the power output of the power plant can be held constant, as indicated by the horizontal line plotted in FIG. 3A, by varying the amount of drag on drag system 112 collectively, so that at any point in time the power required, represented by arrow 114, and the power shed by drag system 112, i.e., the managed power losses represented by arrow 116, add up to a constant amount of power from the power plant. FIG. 3B shows another example, where power plant power delivery is not constant, but is considerably more constant than power demand.

In the power delivery response mode, drag controller 104 can monitor frequency and amplitude at which power is being demanded by the rotorcraft by monitoring at least one of power, torque, rotor speed (NR), control inputs, or power plant state parameters including speed, temperature or amperage. Drag controller 104 can use these monitored parameters for actively managing fluctuations in power required by issuing command output to rotor actuation system 108 to vary drag on one or more rotor blades 110 of the rotorcraft to ensure the power plant can deliver power at the required frequency and/or amplitude and/or to reduce the frequency and/or amplitude of power fluctuation demands from the power plant. In this manner, when additional power is required in the power delivery response mode, the drag controller 104 would decrease the drag which would increase the power available 114 and decrease the power shed 116 without changing the demands on the power plant. Conversely, when less power is required in the power delivery response mode, the drag controller 104 would increase the drag which would decrease the power available 114 and increase the power shed 116 without changing the demands on the power plant.

Drag controller 104 can also monitor ambient conditions, determine whether rotorcraft 100 is in an ambient condition in which the power plant would have an unsatisfactory power-delivery response, and if so, command extra steady state drag on the rotor to drive an increase in power required such that a combination of natural power plant power response rate and a rate at which drag power is shed together can meet a satisfactory power-delivery response. For example, this can ensure compliance with regulations for minimum power response even outside the envelope that would normally be possible without drag control as set forth herein. In another aspect, the method can include monitoring rotorcraft state parameters and a predefined minimum desired power plant state, and commanding an increase of rotor drag such that power plant state parameters do not fall below a predefined threshold.

Those skilled in the art will readily appreciate that it is not necessary for the power delivery response mode to maintain a strictly constant power level from the power plant. A complimentary filtering can be accomplished by drag controller 104, wherein drag controller 104 manages fluctuations in power required at the high fluctuation rates such that the power plant can manage power required fluctuations at lower fluctuation rates as shown in FIG. 3B. In this manner, when additional power is required in the power delivery response mode, the drag controller 104 would decrease the drag which would increase the power available 114 and decrease the power shed 116 while ensuring that the demands on the power plant are within the power level being delivered at that time. Conversely, when less power is required in the power delivery response mode, the drag controller 104 would increase the drag which would decrease the power available 114 and increase the power shed 116 while ensuring that the demands on the power plant are within the power level being delivered at that time.

Figure 4:
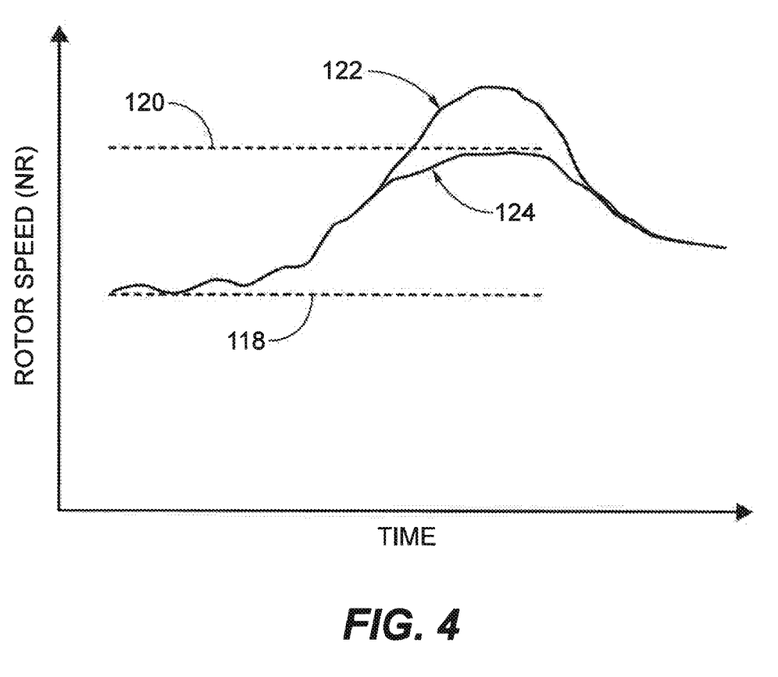
FIG. 4 is a diagram for an exemplary embodiment of an overspeed protection mode for the rotorcraft of FIG. 1.

Referring now to FIG. 4, drag controller 104 can receive a command to enter an overspeed protection mode prior to receiving command input, e.g., from a pilot, crew member, operator, autopilot, or the like, indicative of an intended state change. In the overspeed protection mode, controller 104 monitors rotor speed (NR), and increases rotor drag by commanding rotor actuation system 108 to collectively control drag system 112, to prevent rotor overspeed in response to rotor speed approaching the overspeed threshold. Secondary monitoring of aircraft state such as attitude, pitch/roll rate, speed, as well as control input, and/or control input rate for collective and/or cyclic can also be used, e.g., to refine the command of rotor actuation system 108. An example of where this overspeed condition can exist is during autorotation and autorotation flares when the rotor (e.g., the blade 110, the rotor system, and transmission elements) is generating power and the rotor may be decoupled from the engine E operating at a speed above the nominal operating speed of the rotorcraft. In FIG. 4, the dashed line 118 represents a nominal rotor speed (NR), and the dashed line 120 represents a maximum rotor speed (NR) beyond which an overspeed condition arises. The upper curve 122 represents a hypothetical rotor speed (NR) as a function of time without drag control, and the lower curve 124 represents a corresponding hypothetical rotor speed (NR) curve with drag controller 104 in overspeed protection mode. As shown in FIG. 4, as the rotor speed (NR) approaches the maximum rotor speed (NR), drag is applied by the drag controller 104 by activating the drag system 112 to suppress the rotor speed (NR) to not exceed the maximum, and the process is reversed as rotor speed (NR) returns towards nominal.

Figure 5A:
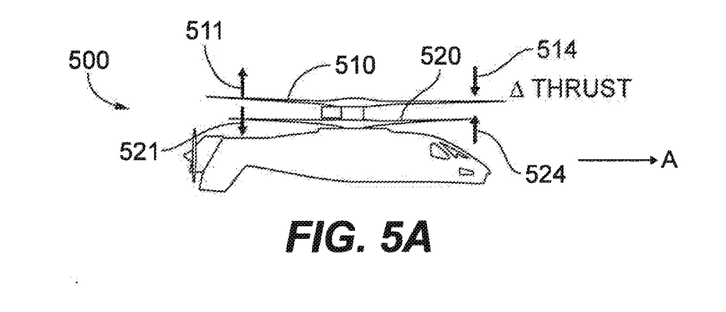
FIG. 5A is a schematic side elevation view of an exemplary embodiment of a coaxial counter-rotating rotorcraft in accordance with the present disclosure, showing opposed cyclic control of the two counter-rotating main rotors for horizontal control of the rotorcraft.
Figure 5B:
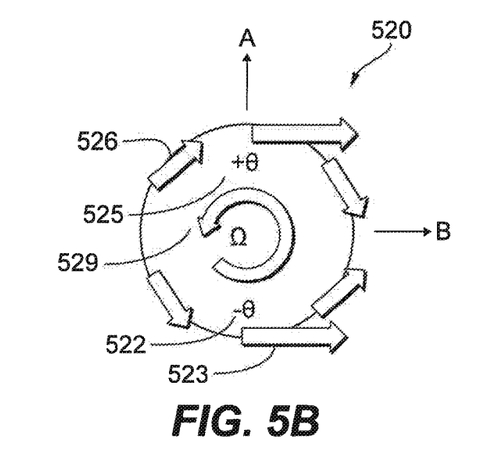
FIGS. 5B and 5C are schematic plan views of the lower and upper main rotors of FIG. 5A, respectively, showing the delta drag vectors for horizontal translation of the rotorcraft.
Figure 5C:
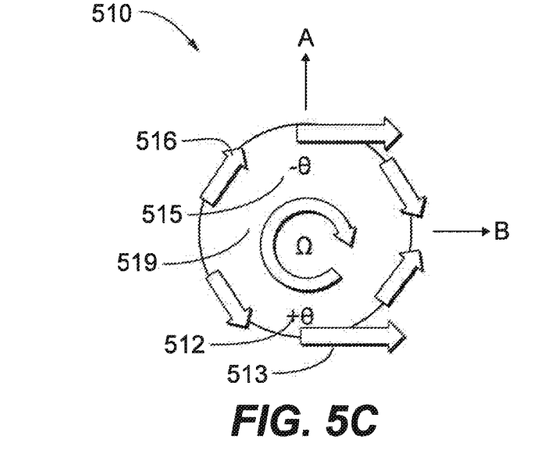

Referring now to FIG. 5A, drag controller 104 can be used to control a coaxial rotorcraft 500 horizontal position in a similar manner as is done for rotorcraft 100, e.g., by way of a rotor actuation system connected to control the coaxial rotors; however, the rotor drag control may alternately or additionally be accomplished using differential cyclic in the top and bottom rotors of coaxial rotorcraft 500. FIG. 5A presents a side view of a coaxial helicopter with axis A aligned with the longitudinal axis of the coaxial rotorcraft 500. The change in out-of plane main rotor thrust on the top and bottom rotors due to application of differential cyclic are shown as main rotor delta thrusts 511, 521, 514, and 524. The differential cyclic main rotor delta thrusts are applied in a manner such that the delta thrusts 511 and 521 cancel and the delta thrusts 514 and 524 cancel each other. As such, the differential cyclic is applied in a manner which results in relatively constant main rotor thrust as well as moment balance in pitch and roll. FIG. 5B presents a top-down schematic view of the drag on the bottom rotor system 520 rotating counter-clockwise as shown by bottom rotor speed 529 with a differential cyclic applied with an increased differential blade pitch 525 applied on the forward portion of the bottom rotor system 520 and a decreased differential blade pitch 522 applied on the aft portion of the bottom rotor 520. Similarly, FIG. 5B shows a schematic top-down view of the drag on the top rotor system 510 rotating clockwise as shown by top rotor speed 519 with a differential cyclic applied with a decreased differential blade pitch 515 applied on the forward portion of the bottom rotor 510 and an increased differential blade pitch 512 applied on the aft portion of the bottom rotor system 510.

Following the application of cyclic and resultant forces, it is seen that delta thrust 524 of FIG. 5A is attained by applying cyclic and increasing blade pitch 525 on the forward portion of the lower rotor which results in a delta forces 526 which are aligned opposite to the direction of rotation as shown in FIG. 5B. Similarly, delta thrust 521 is attained by applying cyclic and decreasing blade pitch 522 on the aft portion of the lower rotor which results in a decrease in drag as indicated by delta forces 523 which are aligned with the direction of rotation of bottom rotor system 520 and which sum with delta forces 526 to be aligned with axis B as shown in FIG. 5B. Normally, a cyclic force applied as 521 and 524 would result in a pitching response of the coaxial rotorcraft 500; however, in this configuration, an opposite cyclic force, e.g., a differential cyclic, is applied to the upper rotor such that there is both force and moment balance as described above for rotorcraft 500. Continuing the above discussion following the application of cyclic and resultant forces to FIG. 5C, it can be seen that as the upper rotor rotates in the opposite direction as indicated by upper rotor speed 519, the application of cyclic to adjust blade pitch change 512 and 515 to oppose blade pitch change 522 and 525 of FIG. 5B, result in delta drag forces 516 and 513 which also sum to be aligned with axis B. Therefore, by applying differential cyclic aligned with axis A, a net drag force may be attained aligned with axis B, and this can be accomplished with or without a drag system 112 as described above.

As was described for rotorcraft 100, axis A is not limited to be aligned with any particular body axis of the coaxial rotorcraft 500 and was shown as aligned with the longitudinal axis of coaxial rotorcraft 500 for ease of illustration. As such, applying differential cyclic along any selected axis A may allow the net drag forces along long axis B be used for translation along axis B, speed control along axis B, or coupled with cyclic to trim aircraft attitude in hover, low-speed flight or high-speed flight.

Additionally, when a high power mode is desired such as that described in FIGS. 3A and 3B, coaxial rotorcraft 500 may apply differential cyclic to reduce rotor efficiency. It is noted that in FIGS. 5A-5C that the differential cyclic is used in a manner which reduces drag on the aft portion of the rotor by reducing blade pitch 522 while increasing blade pitch 525 on the forward portion of the rotor. For small applications of cyclic, the net change in power is nominally zero. However, when large applications of cyclic are used, rotor efficiency suffers resulting in an increase in power required at a constant net thrust summing up the individual delta thrust 521 and delta thrust 524 for the lower rotor 520. Additionally, in the extreme, when large enough cyclic applications are used and the delta thrust 521 is greater than the thrust generated by the aft portion of the bottom rotor 520, then it can be seen that the aft portion of bottom rotor system 520 generates a downforce which must be overcome by application of additional power. As such, if axis A is aligned with the lateral axis of the coaxial rotorcraft 500 in level flight (i.e. using differential lateral cyclic), the retreating blades may be forced into a negative thrust state as opposed to a feathered state in order to increase power required. It is also contemplated that a non-optimal condition may be managed with differential cyclic wherein the retreating blade is not feathered to a minimum power state in order to allow reduced efficiency and increased power required. This increased power required from a known minimum power required state may be managed with differential cyclic through drag controller 104 to attain the benefits discussed above with respect to FIG. 3, but for coaxial rotorcraft 500 which may or may not be equipped with drag system 112.

Additionally, for the purposes of providing overspeed protection as described above with respect to FIG. 4 for coaxial rotorcraft 500, differential cyclic may be applied to increase power required similar to that which was discussed for the coaxial rotorcraft in relation to FIG. 3, but for the purposes of preventing rotor overspeed as in FIG. 4.

Those skilled in the art will readily appreciate that the modes described herein can be used together or separately. While shown and described in the exemplary context of a rotorcraft 100 that is a conventional helicopter, those skilled in the art will readily appreciate that the methods and systems described herein can readily be applied to any suitable type of rotorcraft, including rotorcraft with coaxial main rotors, tiltwing rotorcraft, tandem rotorcraft, and the like.

For brevity and clarity, embodiments described herein discussed reducing efficiency. To those skilled in the art, it will be readily appreciated that many of the modes of operation discussed herein may also be accomplished by increasing the rotor system's efficiency. Such increases in efficiency may be achieved via any number of existing rotor technologies including, but not limited to, active rotor control, individual blade control, and blown wing designs. As such, the term "drag translation mode" described herein refers to a translation mode which adjusts the drag and/or efficiency to either up or down as appropriate for aircraft design and desired mode of operation.

Increasing drag to provide the control described herein can potentially reduce efficiency, e.g., increasing fuel consumption. However, advantages provided by the various embodiments can include reduction of engine cycling, prevention of overspeed conditions, improved power response including an expanded flight envelope, and improved maneuvering.

The methods and systems of the present disclosure, as described above and shown in the drawings, provide for rotorcraft control with superior properties as described above. While described in terms of a main rotor blade system for purposes of example, it is understood that aspects can be used in other blade systems, including tail rotors, propulsor rotors, propellers, maritime propellers, wind turbines and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An aircraft comprising
a rotor system including blades to provide thrust for the aircraft at a rotor efficiency level;
a power system which powers the rotor system at a power output level; and
a controller which selectively changes rotor efficiency of the rotor system to change a rotor system state of the aircraft without changing the power output level, wherein the controller issues command output to the rotor system to carry out the intended state change by adjusting drag and/or efficiency at a substantially constant thrust on one or more rotor blades of the rotorcraft.

2. The aircraft as recited in claim 1, wherein the intended state change includes one or more of a horizontal translation of the rotorcraft, a change in speed of the rotorcraft, and/or a change in trim attitude of the rotorcraft, and wherein the controller issues command output to the rotor system to control rotor drag and/or efficiency as a function of azimuthal blade position cyclically to carry out the horizontal translation.

3. The aircraft as recited in claim 2, wherein the controller issues command output to the rotor actuation system to control one or more of rotor pitch cyclically to counter aircraft rotation in any combination of roll and pitch induced by controlling rotor drag and/or efficiency and to control tail rotor thrust to account for the adjusted main rotor torque due to adjusted drag and/or efficiency of the main rotor.

4. The aircraft as recited in claim 3, wherein countering aircraft rotation includes maintaining substantially constant heading and aircraft attitude in forward or rearward flight while laterally translating to a new track line.

5. The aircraft as recited in claim 3, wherein countering aircraft rotation includes maintaining a substantially constant heading and aircraft attitude while translating to a new position in hover.

6. The aircraft as recited in claim 1, wherein receiving command input includes receiving a command to enter drag translation mode prior to receiving command input indicative of an intended state change and issuing command output.

7. The aircraft as recited in claim 6, wherein the controller receives a command to enter drag translation mode including selecting whether drag translation mode should be entered based on at least one of pilot input, auto-pilot input, and data regarding aircraft state.

8. The aircraft as recited in claim 1, wherein the intended state change includes entering a power delivery response mode, and wherein the controller issues command output to the rotor actuation system to control rotor drag for an intended power delivery response.

9. The aircraft as recited in claim 8, wherein the controller monitors power demand and rotor speed, wherein the controller issues command output to the rotor actuation system to vary rotor drag to maintain substantially constant power output from a power plant powering the rotor blades.

10. The aircraft as recited in claim 8, wherein the controller monitors frequency and amplitude at which power is being demanded by the rotorcraft by monitoring at least one of power, torque, rotor speed, or power plant state parameters including speed, temperature or amperage, and actively manages fluctuations in power required by issuing command output to a rotor actuation system to vary drag and/or efficiency on one or more rotor blades of the rotorcraft to reduce the frequency and/or amplitude of power fluctuation demands from the power plant.

11. The aircraft as recited in claim 8, wherein the controller monitors ambient conditions, determines whether the rotorcraft is in an ambient condition in which the power plant would have an unsatisfactory power-delivery response, and if so, commands extra steady state drag and/or reduced rotor system efficiency on the rotor to drive an increase in power required such that a combination of natural power plant power response rate and a rate at which drag power is shed can meet a satisfactory power-delivery response.

12. The aircraft as recited in claim 8, wherein the controller monitors rotorcraft state parameters and a predefined minimum desired power plant state, commands an increase of rotor drag and/or reduced rotor system efficiency such that power plant state parameters do not fall below a predefined threshold.

13. The aircraft as recited in claim 1, wherein the controller monitors at least one of rotor speed, aircraft pitch, and/or control commands and/or rates for cyclic and/or collective; and increases rotor drag and/or reduces rotor efficiency to prevent rotor overspeed in response to rotor speed approaching overspeed.

14. The aircraft as recited in claim 1, wherein the controller issues command output to the rotor actuation system to apply differential cyclic to two coaxial, counter-rotating rotor systems in a coaxial rotorcraft.

* * * * *